US011330162B2

(12) United States Patent
Matsuka et al.

(10) Patent No.: US 11,330,162 B2
(45) Date of Patent: May 10, 2022

(54) MOVING OBJECT IMAGING DEVICE AND MOVING OBJECT IMAGING METHOD

(71) Applicant: Hitachi, Ltd., Tokyo (JP)

(72) Inventors: Daisuke Matsuka, Tokyo (JP); Kazuhiko Hino, Tokyo (JP); Masahiro Mimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 16/088,214

(22) PCT Filed: Feb. 2, 2018

(86) PCT No.: PCT/JP2018/003580
§ 371 (c)(1),
(2) Date: Sep. 25, 2018

(87) PCT Pub. No.: WO2018/179829
PCT Pub. Date: Oct. 4, 2018

(65) Prior Publication Data
US 2020/0314310 A1  Oct. 1, 2020

(30) Foreign Application Priority Data
Mar. 31, 2017  (JP) .............................. JP2017-069571

(51) Int. Cl.
*H04N 5/225*  (2006.01)
*G06T 7/70*  (2017.01)
(Continued)

(52) U.S. Cl.
CPC ......... *H04N 5/2259* (2013.01); *G02B 26/105* (2013.01); *G03B 15/16* (2013.01);
(Continued)

(58) Field of Classification Search
CPC .................................................... H04N 5/2259
(Continued)

(56) References Cited

U.S. PATENT DOCUMENTS

| 2005/0041241 A1* | 2/2005 | Pahk | ..................... G01B 11/12 |
| | | | 356/237.1 |
| 2006/0104619 A1* | 5/2006 | Yanagi | ................... G03B 13/34 |
| | | | 396/50 |

(Continued)

FOREIGN PATENT DOCUMENTS

| CN | 101753999 A | 6/2010 |
| CN | 103428464 A | 12/2013 |

(Continued)

OTHER PUBLICATIONS

Japanese-language International Search Report (PCT/ISA/210) issued in PCT Application No. PCT/JP2018/003580 dated Apr. 17, 2018 (one (1) page).

(Continued)

*Primary Examiner* — Daniel T Tekle
(74) *Attorney, Agent, or Firm* — Crowell & Moring LLP

(57) ABSTRACT

A technology is provided in which moving objects positioned at a different place and having more than the number of the cameras are displayed on a display device. The present invention is directed to a moving object imaging device including a camera, a deflection unit, a controller configured to control the camera and the deflection unit, an imaging processing part, and an imaging display part, thereby imaging the moving object in a sequentially repeating manner and creating moving image data based upon images acquired by the image processing part to display the created moving image data on the image display part.

10 Claims, 14 Drawing Sheets

(51) Int. Cl.
*G02B 26/10* (2006.01)
*G03B 15/16* (2021.01)
*G06T 7/60* (2017.01)

(52) U.S. Cl.
CPC .................. *G06T 7/60* (2013.01); *G06T 7/70* (2017.01); *H04N 5/2256* (2013.01)

(58) Field of Classification Search
USPC ........................................................ 348/169
See application file for complete search history.

(56) References Cited

U.S. PATENT DOCUMENTS

| | | | |
|---|---|---|---|
| 2007/0200933 A1* | 8/2007 | Watanabe | G08B 13/19643 348/211.11 |
| 2010/0141772 A1 | 6/2010 | Inaguma et al. | |
| 2010/0220194 A1* | 9/2010 | Ishiko | H04N 21/2187 348/169 |
| 2012/0128204 A1 | 5/2012 | Aoba | |
| 2013/0070103 A1* | 3/2013 | Mojaver | H04N 5/23299 348/169 |
| 2013/0314562 A1 | 11/2013 | Shibuya et al. | |
| 2014/0009604 A1 | 1/2014 | Hinderling et al. | |
| 2014/0032021 A1 | 1/2014 | Metzler et al. | |
| 2014/0313390 A1 | 10/2014 | Uemura et al. | |
| 2015/0208916 A1* | 7/2015 | Hayashi | A61B 3/0025 351/208 |

FOREIGN PATENT DOCUMENTS

| | | |
|---|---|---|
| CN | 103492967 A | 1/2014 |
| CN | 103547939 A | 1/2014 |
| DE | 10 2007 058 943 A1 | 6/2009 |
| EP | 3 062 502 A1 | 8/2016 |
| JP | 2015-82720 A | 4/2015 |
| JP | 2015-222913 A | 12/2015 |
| KR | 10-2013-0080940 A | 7/2013 |
| WO | WO 2012/151777 A1 | 11/2012 |

OTHER PUBLICATIONS

Chinese-language Office Action issued in Chinese Application No. 201880001457.0 dated Jun. 5, 2020 with English translation (17 pages).

Extended European Search Report issued in European Application No. 18762444.0 dated Nov. 13, 2020 (eight (8) pages).

* cited by examiner

[FIG. 1]
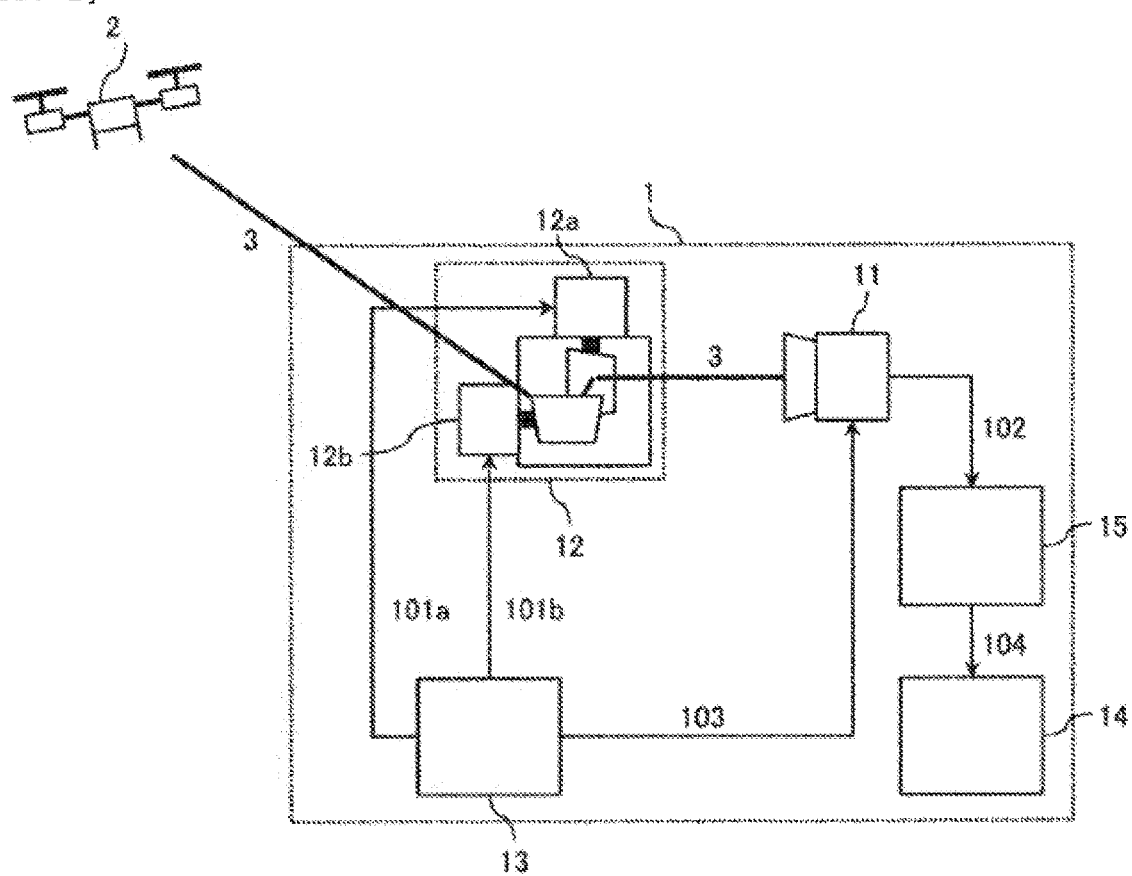

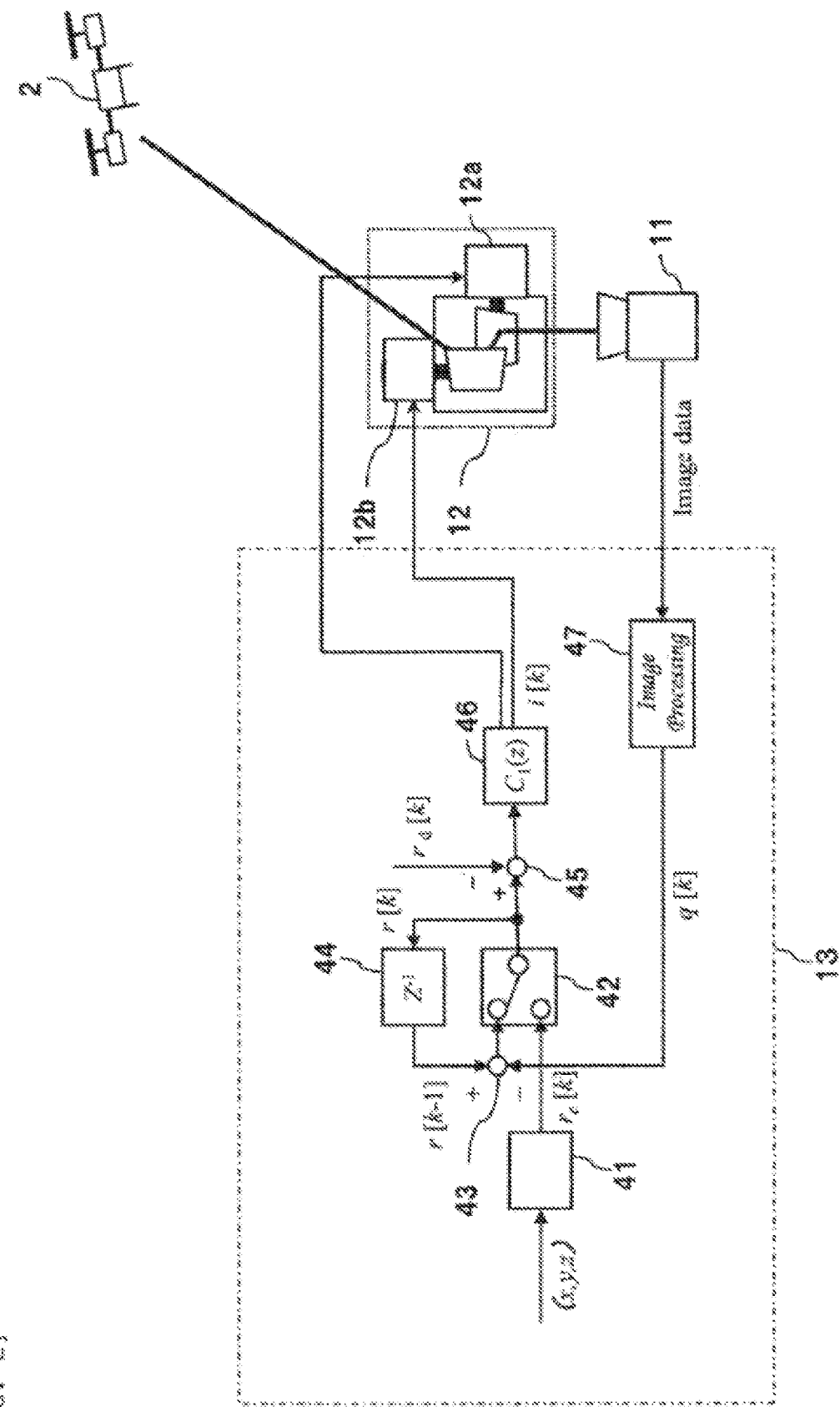
[FIG. 2]

[FIG. 3]
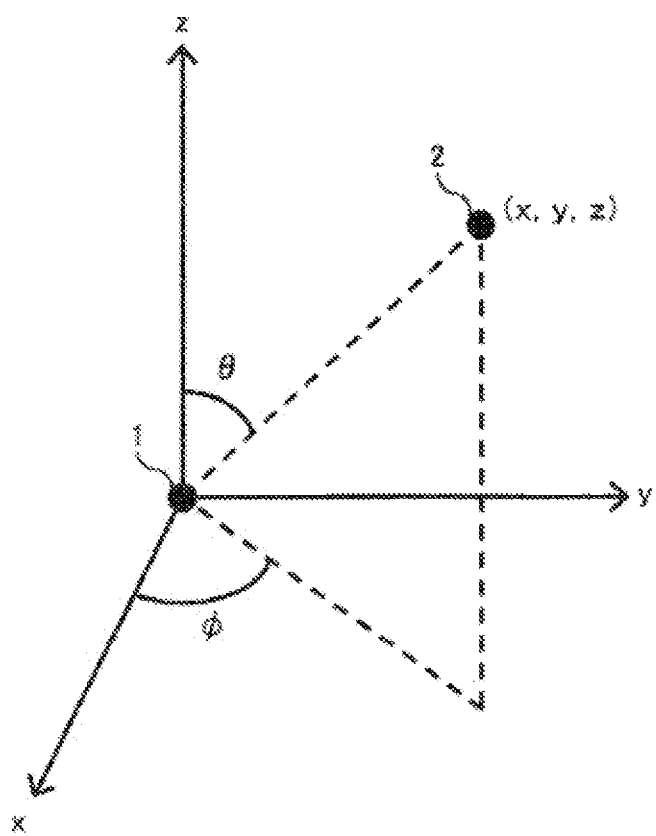

[FIG. 4]
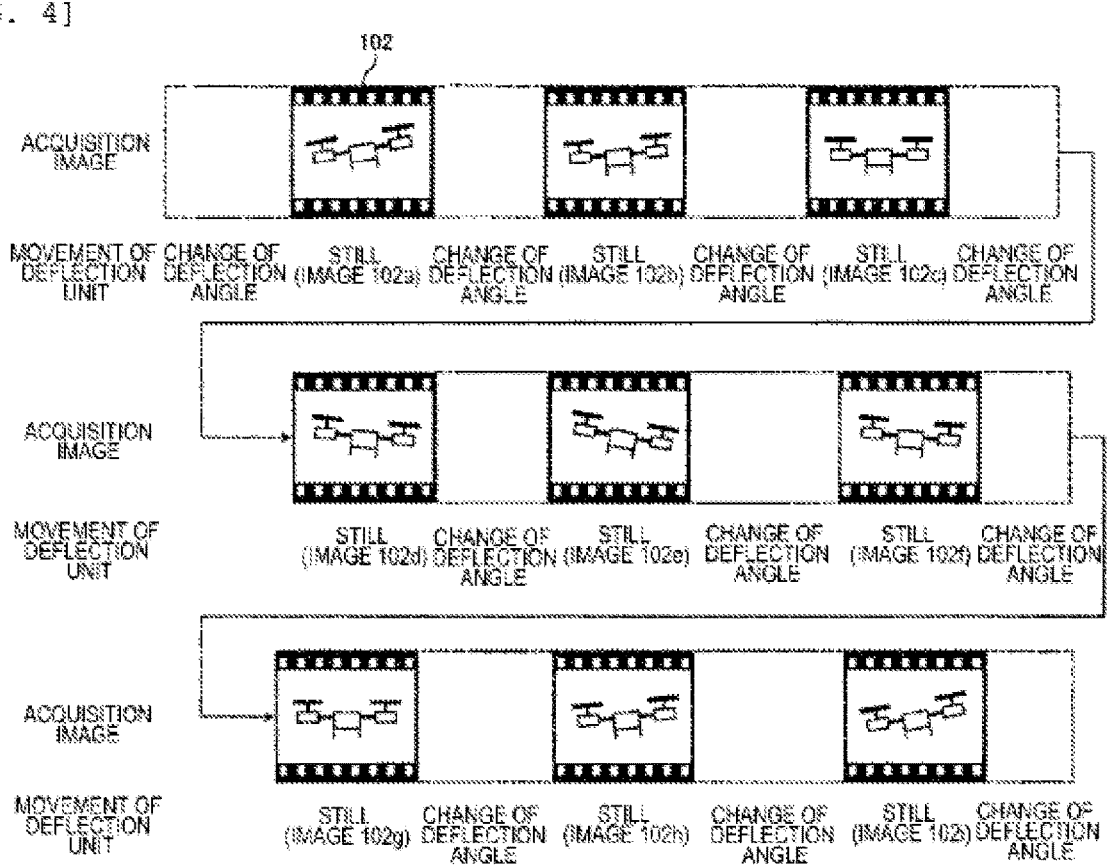

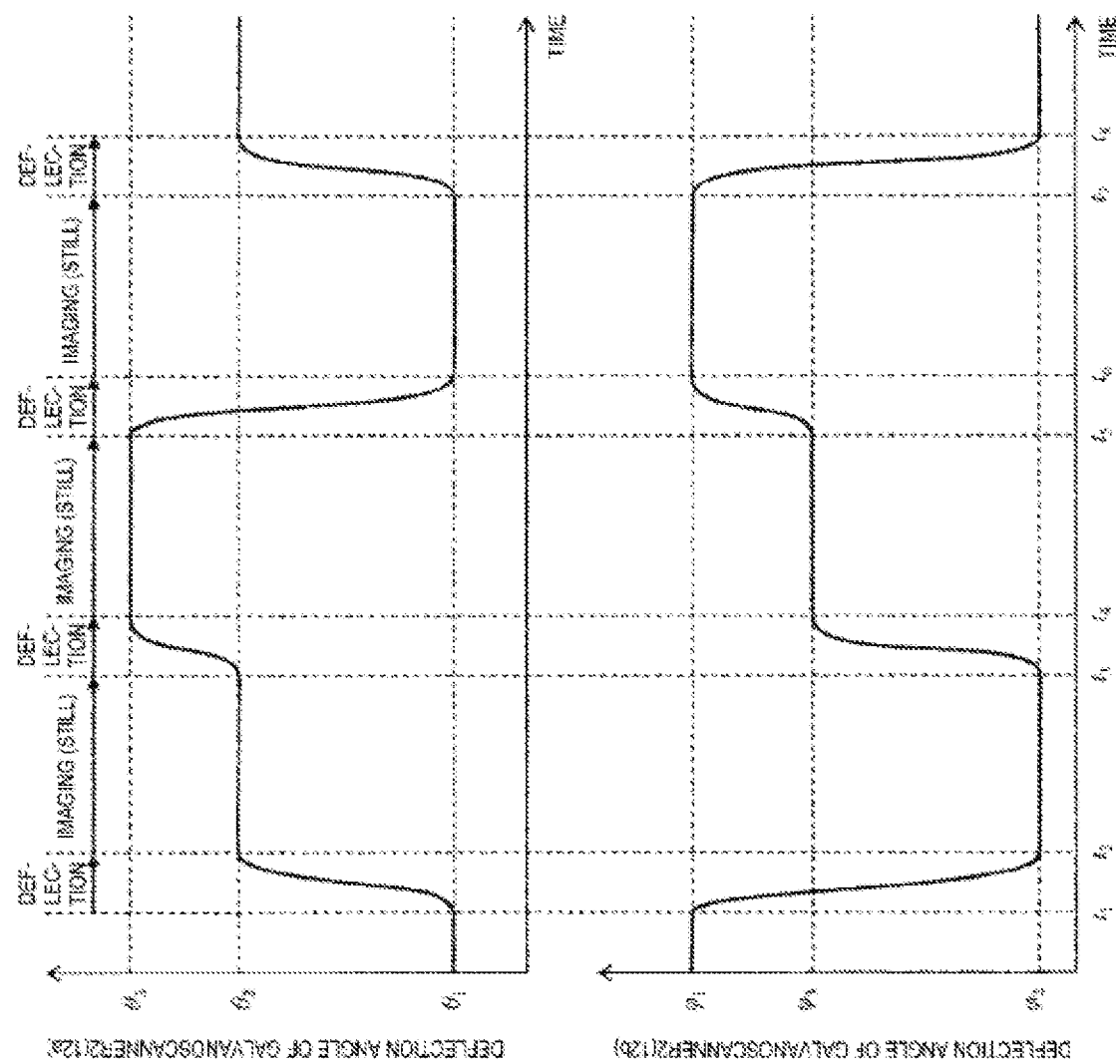
[FIG. 5]

[FIG. 6]
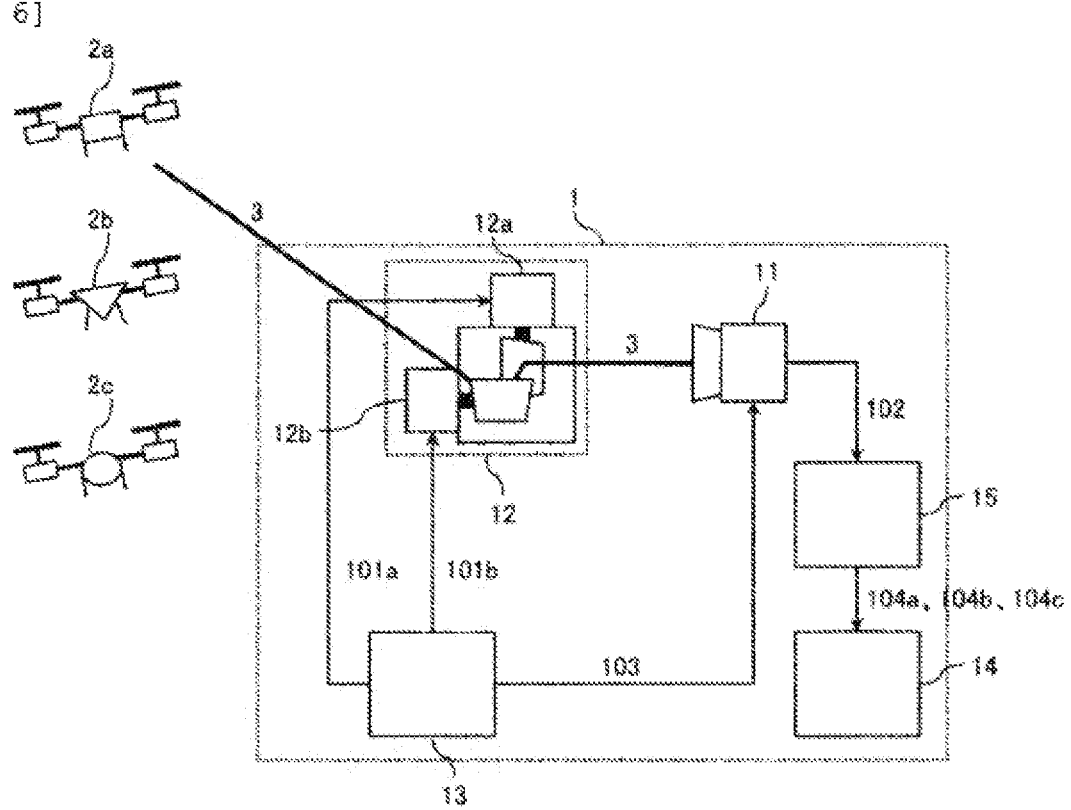

[FIG. 7]
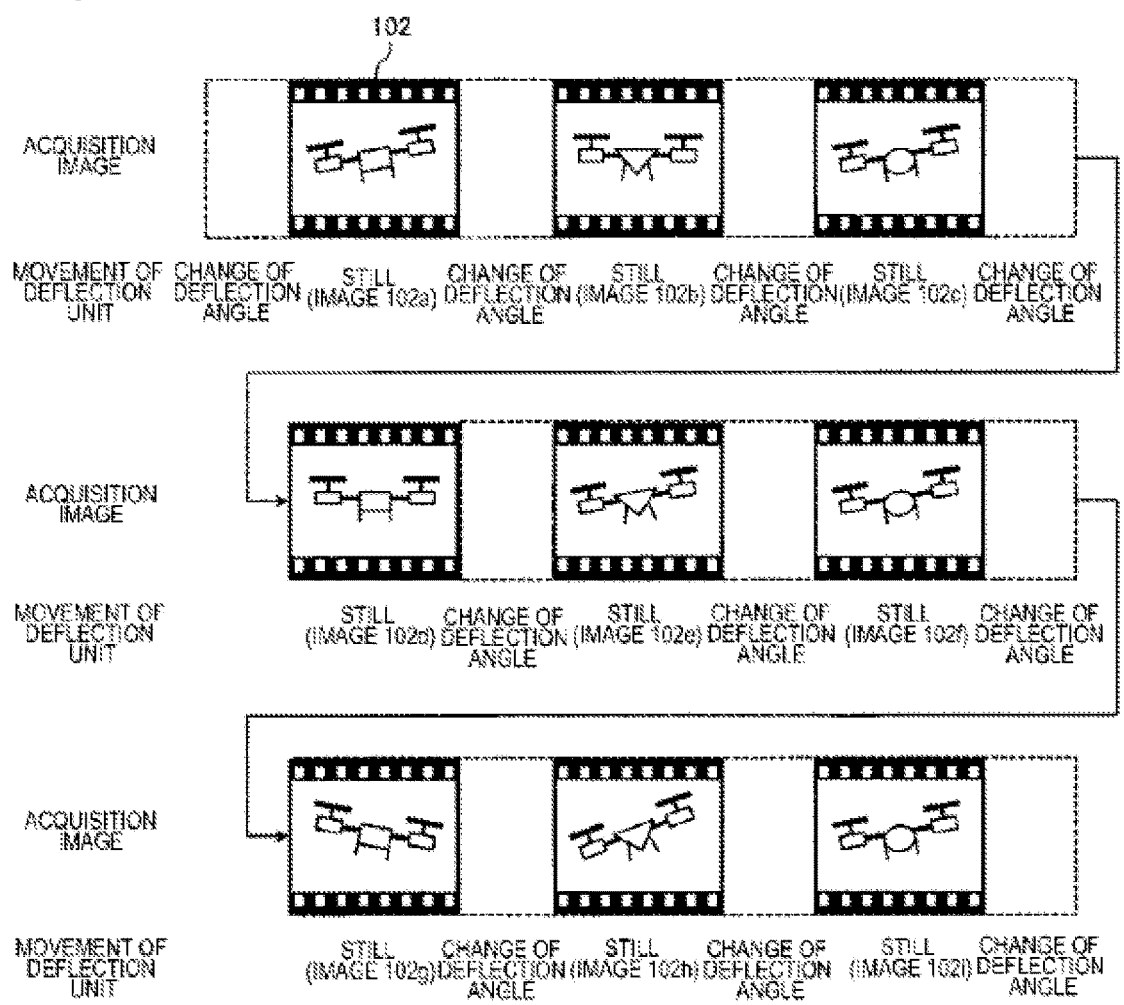

[FIG. 8]
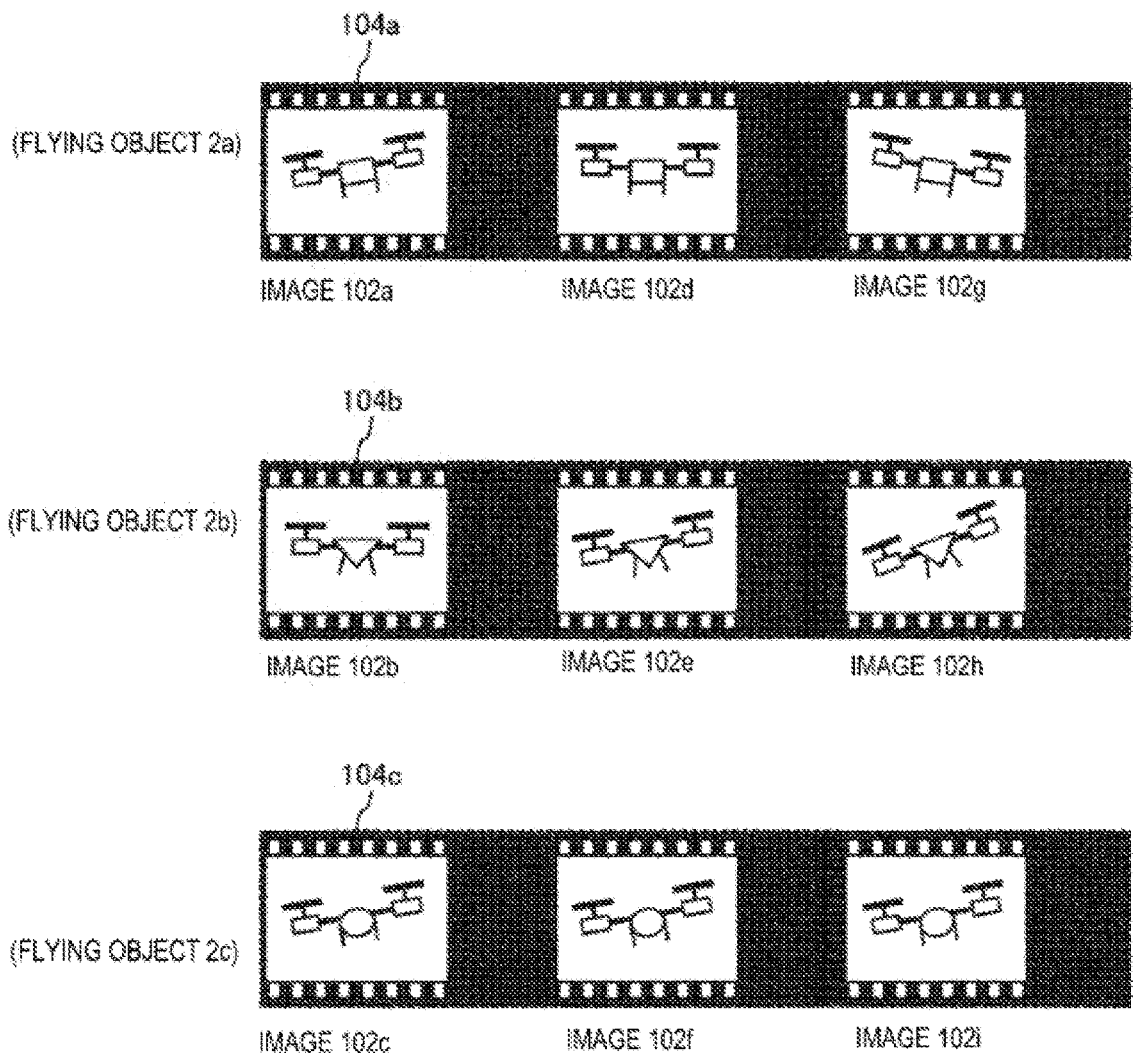

[FIG. 9]
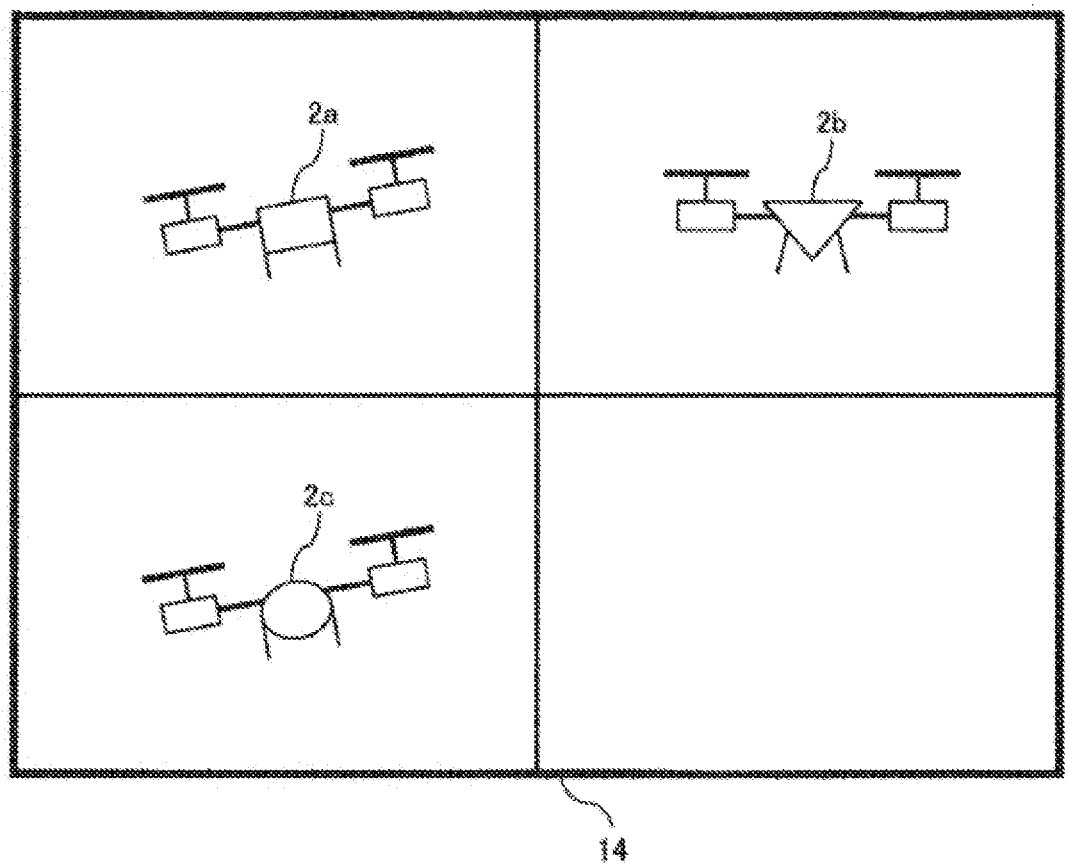

[FIG. 10]
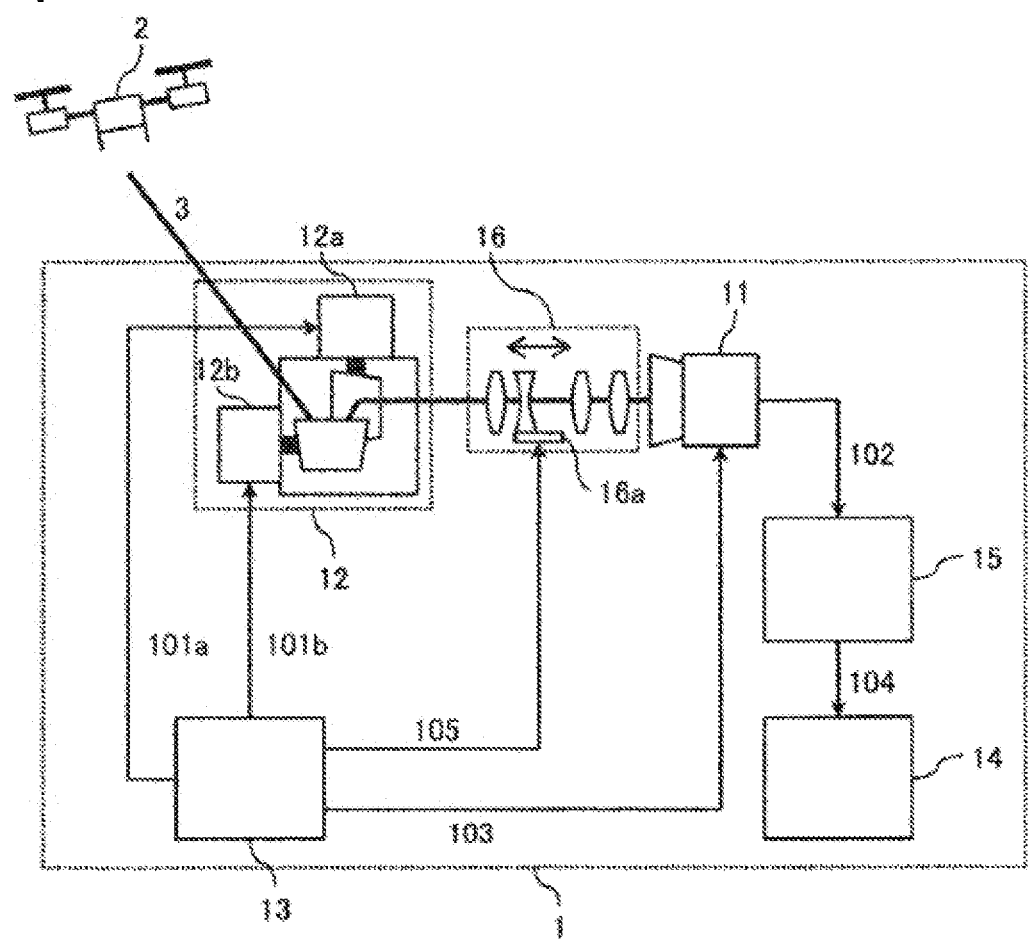

[FIG. 11]
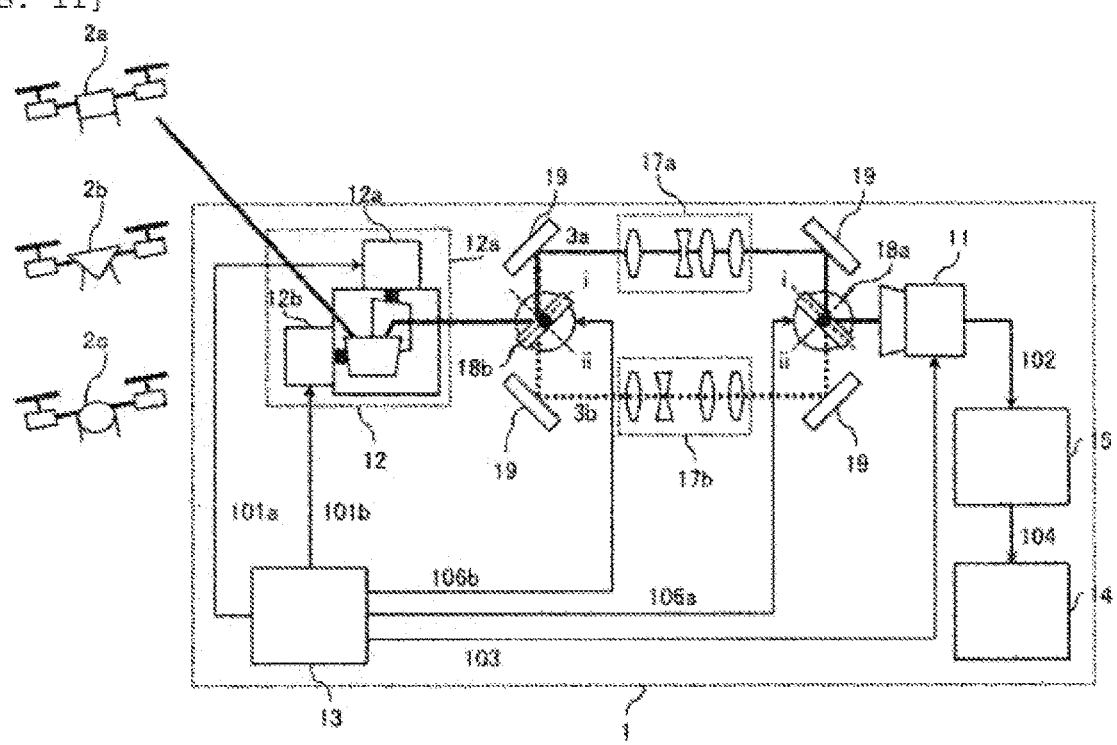

[FIG. 12]
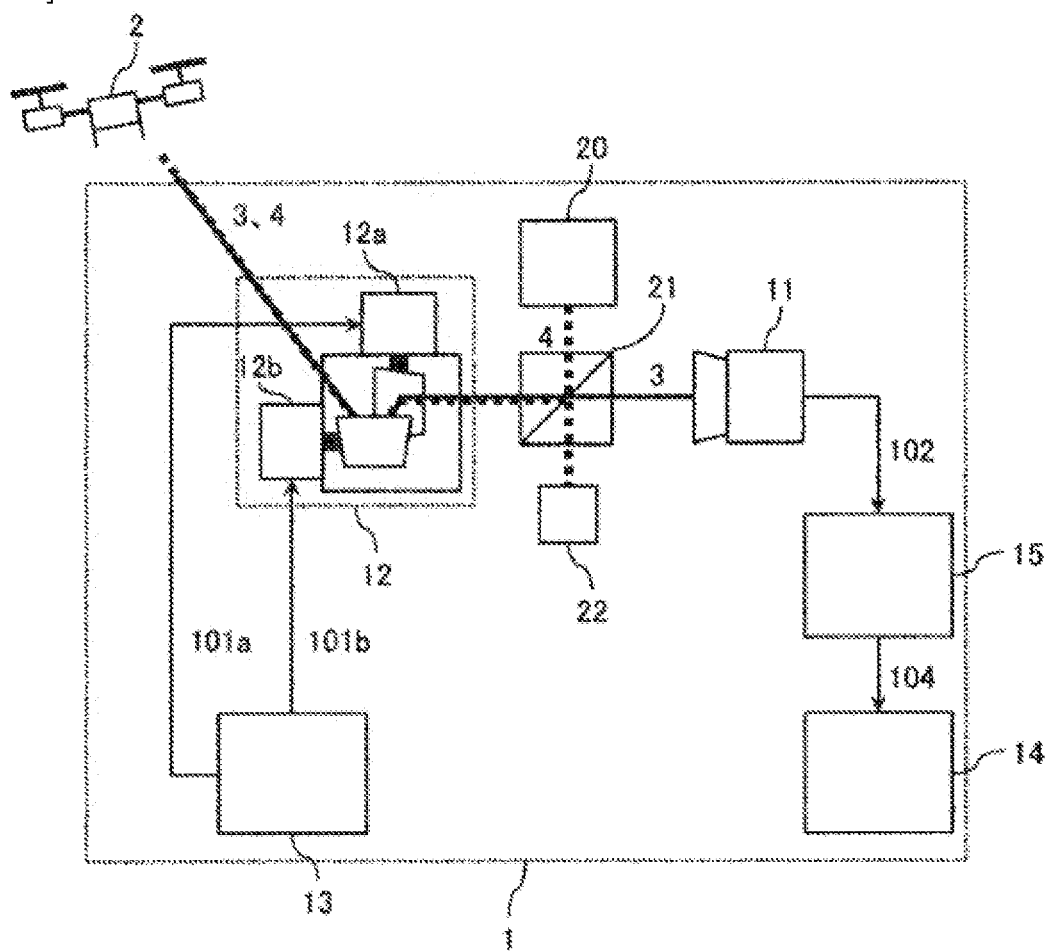

[FIG. 13]
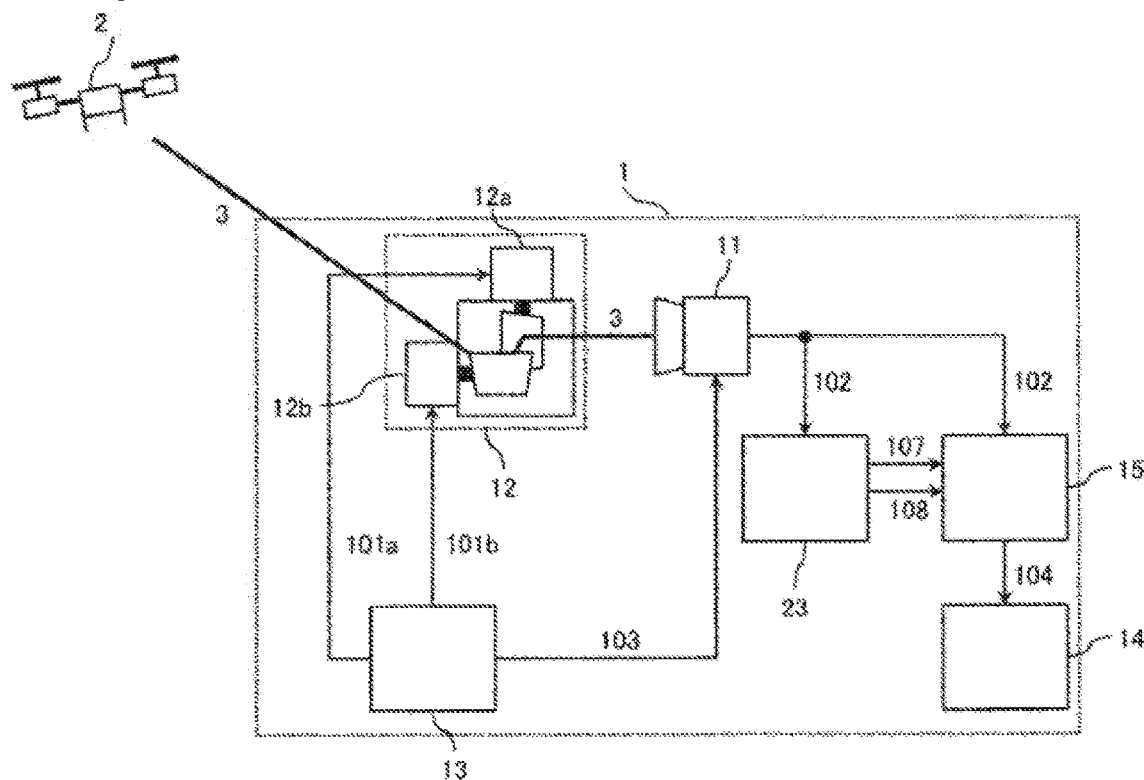
[FIG. 14]
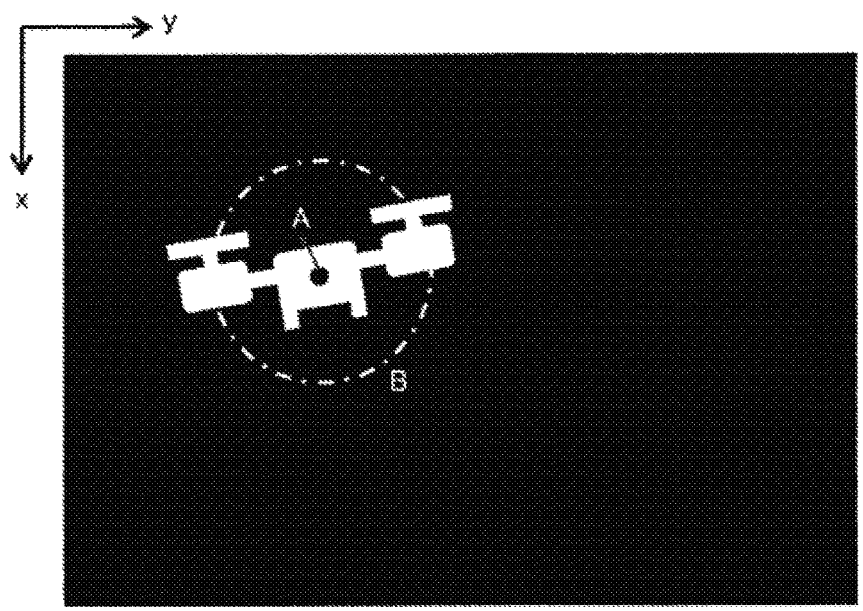

[FIG. 15]
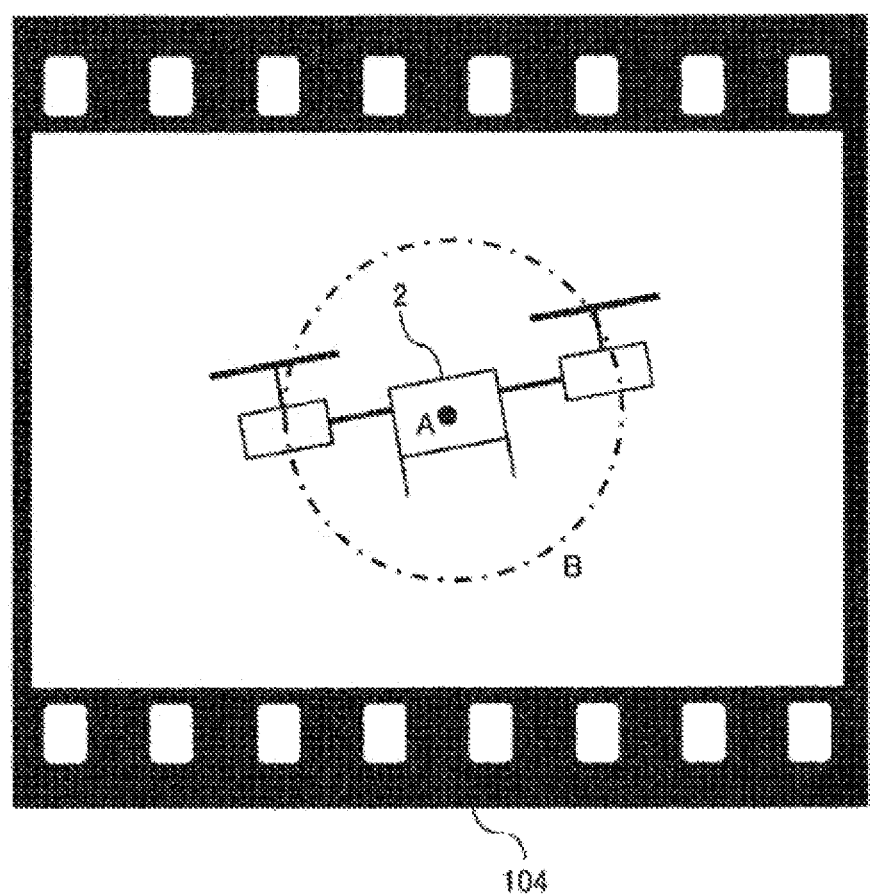

MOVING OBJECT IMAGING DEVICE AND MOVING OBJECT IMAGING METHOD

TECHNICAL FIELD

The present invention relates to a moving object imaging device and a moving object imaging method, and more particularly, to a moving object imaging device and a moving object imaging method suitable for imaging a plurality of objects freely moving in space.

BACKGROUND ART

In a related art, a device for imaging a moving object such as a flying object, and the like moving in a target area has been known. In order to image the moving object, it is required to direct an optical axis of a camera to the moving object so as to capture the moving object within an imaging range of the camera. In order to direct the optical axis of the camera toward the moving object, for example, it has been considered that the camera is mounted on a pan tilt mechanism rotatable at two different axes and the camera is moved by driving the pan tilt mechanism.

In this case, the camera itself is mounted on the pan tilt mechanism and is moved, and a moving speed related to tacking of the moving object is limited by a weight of the camera itself, such that a quick response speed with respect to movement of the camera cannot be expected. Therefore, disclosed is a technology for imaging the moving object while tracking the moving object by using a deflection mirror driven by a Galvano scanner. Specifically, the moving object is imaged with a high-speed imaging period while changing a deflection angle of the deflection mirror. This technology is disclosed, for example, in JP-A-2015-82720 (PTL 1).

CITATION LIST

Patent Literature

PTL 1: JP-A-2015-82720

SUMMARY OF INVENTION

Technical Problem

In the above-mentioned related art, the deflection mirror is driven by the Galvano scanner to track the moving object, and a short characteristic can be achieved with respect to the response time of driving of the Galvano scanner, thereby making it possible to image the moving object having a high moving speed. However, with respect to the tracking of the moving object, required is a camera in which a deflection angle of a deflection mirror is consecutively changed, and the moving object is imaged with a high-speed imaging period so as to cope with the consecutive deflection. As a result, the high-performance camera suitable for high-speed imaging is indispensable.

The present invention has been made in an effort not only to solve the above-mentioned problems, but also to provide a moving object imaging device and a moving object imaging method having a degree of freedom in time with respect to imaging.

Solution to Problem

In order to achieve the above-mentioned object, the present invention is configured to include an imaging unit; a position information acquisition part that obtains position information of a moving object; and a deflector that changes a relative deflection angle of the moving object and the imaging unit, and is configured to image an image of the moving object using the imaging unit through the deflector, wherein the deflector is moved to a predetermined deflection angle so that the moving object enters a visual field of the imaging unit based upon position information of the moving object obtained from the outside; and the moving object is imaged in a state of keeping the deflection angle.

Alternatively, the present invention includes a camera, a deflection unit, a controller configured to control the camera and the deflection unit, an image processing part, and an image display part, wherein imaging of the moving object is sequentially repeated and moving image data is created based upon images acquired by the image processing part, thereby displaying the created moving image data on the image display part.

Advantageous Effects of Invention

According to the present invention, it is possible to image a moving object with a degree of freedom in time.

BRIEF DESCRIPTION OF DRAWINGS

FIG. 1 is a block diagram of a moving object imaging device and a moving object according to a first embodiment.

FIG. 2 is a block diagram of a controller according to the first embodiment.

FIG. 3 is a diagram illustrating a positional relationship between the moving object imaging device and the moving object according to the first embodiment.

FIG. 4 is a diagram illustrating a relationship between imaging and time axis of deflection operation according to the first embodiment.

FIG. 5 is a diagram illustrating a relationship in time axis of deflection operation of a Galvano scanner according to the first embodiment.

FIG. 6 is a block diagram of a moving object imaging device and a flying object according to a second embodiment.

FIG. 7 is a diagram illustrating a relationship between imaging operation and time axis of change operation of a deflection angle according to the second embodiment.

FIG. 8 is a moving image data of each flying object that is processed in an imaging processing part according to the second embodiment.

FIG. 9 is one example of an image displayed on an image display part according to the second embodiment.

FIG. 10 is a block diagram of a moving object imaging device and a flying object according to a third embodiment.

FIG. 11 is a block diagram of a moving object imaging device and a flying object according to a fourth embodiment.

FIG. 12 is a block diagram of a moving object imaging device and a flying object according to a fifth embodiment.

FIG. 13 is a block diagram of a moving object imaging device and a flying object according to a sixth embodiment.

FIG. 14 is a diagram describing an image clipping operation in an image processing part according to the sixth embodiment.

FIG. 15 is a block diagram of a moving object imaging device and a flying object according to a seventh embodiment.

DESCRIPTION OF EMBODIMENTS

Hereinafter, each embodiment of the present invention will now be described. In the embodiment described hereinafter, for the sake of convenience, when necessary, the embodiment will be divided into a plurality of embodiments, however, unless otherwise specified, the embodiments are not unrelated to each other, and one embodiment has a relationship with a part or whole parts of the other embodiment with respect to modifications, details, supplementary descriptions, and the like. Further, in all of the drawings for describing the embodiments described hereinafter, those having the same functions will be denoted by the same reference signs in principle, and repeated descriptions thereof will be omitted. Hereinafter, the embodiments of the present invention will be described with reference to the drawings.

First Embodiment

FIG. 1 illustrates a block diagram including a moving object imaging device 1 and a flying abject 2 which is a moving object according to the embodiment. FIG. 1 is a drawing illustrating the flying object 2 viewed from a side-surface side. The moving object imaging device 1 according to the embodiment includes a camera 11 (also referred to as an imaging unit); a two-dimensional Galvano unit 12 (also referred to as a deflection unit or a deflector); a controller 13 for controlling the camera 11 and the deflection unit 12; an image processing part 15; and an image display part 24. Further, the moving object imaging device 1 sequentially repeats imaging of the moving object (flying object 2), creates moving image data based upon an image acquired by the imaging processing part 15, and displays the created moving image data on the image display part 14. Further, the moving object imaging device 1 is characterized in that after the camera 11 finishes the imaging, the camera 11 starts to change a deflection angle, after which the next imaging is performed after the camera 11 is adjusted to a predetermined deflection angle.

As shown in FIG. 1, the moving object imaging device 1 according to the embodiment includes the camera 11; the two-dimensional Galvano unit 12; the controller 13 for controlling the camera 11 and the two-dimensional Galvano unit 12; the image processing part 15 for processing still images acquired by the camera 11 as a moving image; and the image display part 14. An external device (not shown) for measuring a position of another moving object such as a radio wave detection and measurement device (radar), and the like is installed in the periphery of the moving object imaging device 1 of the embodiment, and the controller 13 is given three-dimensional relative position information of the moving object imaging device 1 and the flying object 2 which is an object to be imaged (hereinafter, referred to as position information of the flying object 2) by an outside (external device) through a position information acquisition part (not shown) inside the controller 13. Further, the imaging period of the camera of the embodiment is slower in comparison with a position determination speed of the Galvano scanner. The two-dimensional Galvano unit 12 which is a deflection unit includes a Galvano scanner 12a which swings a deflection mirror provided at a tip in a first direction; a Galvano scanner 12b which swings a deflection mirror provided at a tip in a second direction; a Galvano driving part (not shown) which drives the Galvano scanner 12a; and a Galvano driving part (not shown) which drives the Galvano scanner 12b. Here, the first direction of swinging the deflection mirror by the Galvano scanner 12a and the second direction of swinging the deflection mirror by the Galvano scanner 12b are orthogonal to each other. A general pan and tile method is not used as the deflection unit, and as described above, the Galvano scanner in which the deflection angle is changed by driving a pair of reflection mirrors by a swing motor is used, thereby making it possible to perform the deflection with high speed and high accuracy.

Further, the controller 13 and the image processing part 15 may be respectively constituted by hardware such as ASIC and FPGA, may be constituted by software which executes a program loaded into a memory by a computation device such as a CPU, and the like, and may be constituted by a combination of the hardware and the software. The controller 13 and the image processing part 15 of the embodiment are described as the software controlled by the computation device such as the CPU, and the like.

Next, imaging operation of the moving object imaging device 1 will be described. The controller 13 calculates target deflection angles of the Galvano scanner by using a unit which will be described later from the position information of the flying object 2 given from the outside, and adjusts and outputs an applied voltage so that driving currents 101a and 101b corresponding to the target deflection angles flow through the respective Galvano scanners 12a and 12b. As a result, an optical axis 3 of the camera 11 of the moving object imaging device 1 faces the flying object 2. When the above-mentioned position determination operation is completed, the controller 13 outputs an imaging trigger signal 103 to the camera 11, and the camera 11 performs the imaging. An image 102 acquired by the camera 11 is transmitted to the image processing part 15, and image processing which will be described later is performed to create a moving image data 104, and the moving image data 104 is transmitted to the image display part 14. A moving image including the flying object 2 is always displayed on the image display part 14.

Next, a functional block diagram of the controller 13 is illustrated in FIG. 2. Control of the deflection angles of the Galvano scanners 12a and 12b (hereinafter referred to as an external command mode) based upon the measurement of a moving object position measurement unit will be described. In this case, a changeover switch 42 becomes on a lower side (automatically switched by mode determination).

Calculation of target deflection angles $r_c$ [k] ($\theta$ [k], $\phi$ [k]) of a target deflection angle calculation part 41 in the controller 13 will be described. Here, k of a subscript indicates that K is a numerical value at a certain time, and k−1 indicates that K−1 is a numerical value before one control period. As shown in FIG. 3, in a positional relationship between the moving object imaging device 1 and the flying object 2 in a case where the moving object imaging device 1 and the other moving object position measurement unit are regarded as the same position, target deflection angles $\theta$ (angle with respect to z-axis) and $\phi$ (angle with respect to x-axis) of respective Galvano scanners 12a and 12b in a case where the optical axis 3 of the camera 11 faces the flying object 2 are obtained from position information (x, y, z) which is a relative position with respect to the moving object imaging device 1 of the flying object 2 by the following equation.

$$\theta = \arccos\left(\frac{z}{\sqrt{x^2 + y^2 + z^2}}\right) \quad \text{[Equation 1]}$$

$$\phi = \text{sgn}(y)\arccos\left(\frac{x}{\sqrt{x^2 + y^2}}\right)$$

however $$\text{sgn}(y) = \begin{cases} 1 & (y \geq 0) \\ -1 & (y < 0) \end{cases}$$

At the moment, since the changeover switch 42 is on the lower side, an adder 45 computes a deviation between target deflection angles $r_c[k]$ ($\theta[k]$, $\phi[k]$), and actual deflection angles $r_d[k]$ ($\theta d$, $\phi d$) which is the deflection angles of the current Galvano scanners 12a and 12b. A current controller 46 applies a driving current i [k] (101a with respect to the Galvano scanner 12a and 101b with respect to the Galvano scanner 12b) to the Galvano scanners 12a and 12b, so that the deviation becomes zero.

Next, the control of the deflection angles of the Galvano scanners 12a and 12b (hereinafter referred to as a tracking mode) based on the image data of the camera 11 will be described. The image processing part 47 processes an image of the camera 1 and computes optical axis deviation amount deflection angles q[k] ($q\theta[k]$, $q\phi[k]$) of the camera 1. Since the changeover switch 42 is on an upper side, the adder 43 performs addition computation by using target deflection angles $r_c[k-1]$ ($\theta[k-1]$, $\phi[k-1]$) before one control period obtained by a delay computer circuit 44, with respect to a value obtained by inverting the positive and negative of the optical axis deviation amount deflection angle q[k]. A deviation between the value obtained just above and the actual deflection angles $r_d[k]$ ($\theta d[k]$, $\phi d[k]$) is computed. The current controller 46 applies a driving current i[k] (101a, 101b) to the Galvano scanners 12a and 12b so that the deviation becomes zero.

Further, normally a follow-up mode is used for the operation, and the controller 12 may be automatically switched to the external command mode when the flying object 2 is out of a visual field of the camera 1 and cannot be supplemented.

Accordingly, the controller 12 adjusts the applied voltage so that the deflection angles of the respective Galvano scanners 12a and 12b become $\theta$ and $\phi$, thereby flowing the driving currents 101a and 101b to the respective Galvano scanners 12 and 12b, whereby, as a result, the optical axis 3 of the camera 11 faces the flying object 2.

Next, imaging operation of the camera 11 will be described with reference to FIGS. 4 and 5. FIG. 4 is an explanatory diagram illustrating the image 102 acquired by the camera 11 and movement of the two-dimensional Galvano unit 12 which is a deflection unit in a time series system and in a schematic manner. FIG. 5 is an explanatory diagram illustrating the movement of the two-dimensional Galvano unit which is a deflection unit in time series and in a schematic manner.

In the moving object imaging device 1, when the position information of the flying object 2 is provided from another moving object position measurement unit, the controller 12 calculates the target deflection angles and drives the two-dimensional Galvano unit which is the deflection unit.

In FIG. 5, the two-dimensional Galvano unit, in which deflection angles $\theta1$ and $\phi1$ are obtained at time t1, is driven. As a result, deflection angles $\theta2$ and $\phi2$ are obtained at time t2. When position determination operation is completed at the time t2, the optical axis 3 of the camera 11 faces the flying object 2. In this state, the controller 12 outputs the imaging trigger signal 103 to the camera 11, and acquires an image by the camera 11 from the time t2 to a time t3 (image 102a).

When the image is acquired, the position determination operation to the target deflection angles calculated based upon the position information of the flying object 2 is started again at time the t3, and the two-dimensional Galvano unit is driven to become deflection angles $\theta3$ and $\phi3$. When becoming the deflection angles $\theta3$ and $\phi3$, imaging is performed by the camera 11 (image 102b). Accordingly, consecutive images 102a to 102i including the flying object 2 in an imaging range are obtained by alternately performing the imaging and the position determination operation. At this time, an information update period of the moving object position measurement unit and an imaging period of the camera may be synchronized with each other, or may not be synchronized with each ocher, in the asynchronous case, when the update period of the position information of the flying object 2 is slower than the imaging period of the camera 11, since the Galvano scanner is not moved until the next information update and the camera 11 continues to perform imaging with the same optical axis, the image 102 becomes a plurality of still images, that is, becomes a moving image.

In the image processing part 15, color tone correction processing is performed so that the flying object can be clearly seen in the image 102a. When the imaging period of the camera 11 is the same as the image update period of the image display part 14, the image processing part 15 executes only the color tone correction processing, and creates moving image data 14 obtained by combining the acquired images with each other. Further, the color tone correction method includes level correction using a histogram showing how pixels in the image are distributed in each gradation, tone curve correction capable of adjusting the color tone and color of the whole image, and the like. On the other hand, when the imaging period of the camera 11 is slower than the image update period of the image display part 14, the moving image data 104 is created so that the image 102a is continuously displayed on the image display part 14 during the time period when the image 102b is obtained from the time when the image 02 is obtained. In contrast, when the imaging period of the camera 11 is faster than the image update period of the image display part 14, the image data at the time of updating the image are combined with each other to create the moving image data 14.

According to the procedures described above, the moving image including the flying object 2 is always displayed on the image display part 14.

Second Embodiment

FIG. 6 is a block diagram of the moving object imaging device 1 and flying objects 2a, 2b, and 2c according to the embodiment. The moving imaging device 1 according to the embodiment images a plurality of the flying objects 2a, 2b, and 2c by sequentially changing the optical axis 3 of the camera 11, creates a plurality of moving image data 104 by the image processing part 15, and simultaneously displays the plurality of flying objects on the image display part 14. In the moving object imaging device 1 according to the embodiment, three-dimensional relative position information of the moving object imaging device 1 and the flying objects 2a, 2b, and 2c (hereinafter, referred to as position information of the flying objects 2a, 2b, and 2c) is provided to the controller 13 at the same update period from another moving object position measurement unit (not shown). The controller 13 according to the embodiment sequentially computes the target deflection angles $r_c[k]$ ($\theta$, $\phi$) by the controller 13 according to each position information of the flying bodies 2a, 2b, and 2c, and drives the two-dimensional Galvano unit 12, thereby changing the deflection angles.

Further, since the computation method of the target deflection angles are the same as that of the first embodiment, the descriptions thereof will be omitted. When the position determination of the two-dimensional Galvano unit 12 is completed, the controller 13 outputs the imaging trigger signal 103 to the camera 11, and the imaging is performed by the camera 11. The image 102 acquired by the camera 11 is transmitted to the image processing part 15, and the image processing which will be described later is performed to create the moving image data 104a, 104b and 104c of each flying object, after which the generated moving image data 104a, 104b, and 104C are transmitted to the image display part 14. The moving image including the flying objects 2a, 2b, and 2c is always displayed on the image display part 14.

Next, the imaging operation of the camera will be described with reference to FIG. 7. FIG. 7 is an explanatory diagram illustrating the image 102 acquired by the camera 11 and movement of the two-dimensional Galvano unit 12 which is the deflection unit in a time series system and in a schematic manner. In the moving object imaging device 1 according to the embodiment, when the position information of flying objects 2a, 2b, and 2c are provided from another moving object position measurement unit, the controller 12 first computes the target deflection angles with respect to the flying object 2a and drives the two-dimensional Galvano unit which is the deflection unit. When the position determination operation is completed and the optical axis 3 of the camera 11 faces the flying object 2a, the controller 12 outputs the imaging trigger signal 103 to the camera 11 and acquires the image 102a including the flying object 2a. When the image including the flying object 2a is acquired, the target deflection angles are computed based upon the position information of the flying object 2b, and the two-dimensional Galvano unit 12 is driven, when the position determination operation is completed, the camera 11 performs the imaging, thereby acquiring the image 102b. When the image including the flying object 2b is acquired, the target deflection angles are computed based upon the position information of the flying object 2c, and the two-dimensional Galvano unit 12 is driven. When the position determination operation is completed, the camera 11 performs the imaging, thereby acquiring the image 102c. When imaging three flying objects as shown in the embodiment, it is possible to consecutively acquire the objects to be imaged by sequentially changing the flying objects as follows; 2a→2b→2c→2a→2b→2c . . . Accordingly, consecutively images 102a to 102i including the target flying object in the imaging range are obtained by sequentially performing the imaging and position determination operation with respect to the plurality of flying objects. At this time, the imaging period of the camera 11 and the position information update period of the flying object obtained from the moving object position measurement unit may be synchronized with each other or nay not be synchronized with each other. In the asynchronous case, the imaging period is handled as the operation period of the two-dimensional Galvano unit 12 (deflection unit), and the positional information at a time point when the deflection angle is started to be changed is used.

Next, processing of the image processing part 15 will be described with reference to FIG. 8. FIG. 8 illustrates the moving image data 104a, 104b, 104c of each flying object processed by the image processing part 15 of the embodiment. The images of flying objects 2a, 2b, and 2c are arranged in the image data 102a, 102b . . . obtained by the image processing part 15 in a time series order. In the image processing part 15 of the embodiment, these images are made into a plurality of moving image data divided for every flying object. Three flying objects are mixed in an image group imaged by the camera 11 of the embodiment, and among three flying objects, images on which the flying object 2a is imaged are images 102a, 102d, and 102g. In the image processing part 15, only images including the flying object 2a are combined in a time series order with respect to images on which the color tone correction processing is performed so that the flying object 2a is seen clearly, and the moving image data 104a related to the flying object 2a is created. The same processing is applied to the flying objects 2b and 2c, thereby obtaining the moving image data 104b and 104c. At this time, the update period of each obtained moving image data becomes a part of the number of the flying objects of the imaging period.

FIG. 9 is a diagram illustrating one example of display in the image display part 14 in the embodiment. The image display part 14 divides an area of a screen according to the number of the flying objects, and displays respective moving images.

According to the procedures described above, the moving images including the flying objects 2a, 2b and 2c can be always displayed on the image display part 14 at the same time. Further, in the embodiment, three pieces of moving image data are transmitted to the image display part, however, a still image including each flying object in the image processing part 15 may be reconstituted as one still image by diving a screen, and may be created as a moving image by combining the still images each other in a time series. In this case, the created moving image data becomes one.

Third Embodiment

FIG. 10 is a block diagram of the moving object imaging device 1 and the flying object 2 according to the embodiment. The moving object imaging device 1 according to the embodiment is provided with an optical magnification adjustment mechanism 16, and, and the controller 13 for controlling the camera 11, the two-dimensional Galvano unit 12, and the optical magnification adjustment mechanism 16. Further, the optical magnification adjustment mechanism of the embodiment is constituted with four lenses and one linear stage 16a, and a change of a focal length of the lens system is realized by moving one lens position in an optical axis direction of the camera 11 by the linear stage 16a.

The basic operation related to the imaging and the display is the same as that of the first embodiment, however, the controller 13 of the embodiment has a different point in that a position command 105 is transmitted to the linear stage 16a so that a focal length of the optical magnification adjustment mechanism 16 becomes appropriate from the position information of the flying object 2 given by another moving object measurement device. Now, when the flying object 2 is long in a horizontal direction of the camera 11 and is displayed on the screen with a size of about ⅛ of the screen, the focal length f (mm) of the optical magnification adjustment mechanism 16 can be computed by the following equation.

$$f = \frac{la}{8w}$$ [Equation 2]

Here, "l" is a distance (m) to the flying object, "a" is a horizontal size (mm) of an image sensor, "w" is a horizontal width (m) of the flying object. For example, when the image sensor of the camera 11 is a ½ type (horizontal 6.4 mm and vertical 4.8 mm), the distance to the flying object is 100 m and the width of the flying object is 0.5 m, the focal length may be set to 160 mm. The controller 13 drives the linear stage so that the focal length of the lens system becomes the calculated f, thereby making it possible to display the moving image including about ⅛ of the screen of the flying object 2 on the image display part 14.

Fourth Embodiment

FIG. 11 is a block diagram of the moving object imaging device 1 and the flying objects 2a, 2b, and 2c according to the embodiment. The moving object imaging device 1 according to the embodiment is characterized by including an optical system having a plurality of magnifications. The optical system has different points from the second embodiment in that two lens systems 17a (telephoto) and 17b (wide angle) which are different in the optical magnification are provided; two Galvano scanners 13a and 18b as optical path switching unit are provided; and a plurality of deflection mirrors 19 are provided.

The basic operation related to the imaging and the display is the same as that of the second embodiment, but is different therefrom in that the controller 13 of the embodiment selects a suitable optical system from the position information of the flying bodies 2a, 2b, and 2c obtained from another moving object measurement device (not shown), and drives the Galvano scanners 18a and 18b for switching the optical path. Specifically, when the flying object 2a is farther than the moving object imaging device 1, driving currents 106a and 106b are flown and driven so that the deflection angles of the Galvano scanners 18a and 18b become i-side, in order that the optical axis of the camera 11 becomes an optical axis 3a passing through a lens system 17a of a telephoto side. On the other hand, when the flying object 2a is close to the moving object imaging device 1, the deflection angles of the Galvano scanners 18a and 18b are set to be a side of ii so that the optical axis of the camera 11 becomes the optical axis 3b passing through a lens system 17b on a wide angle side. Although the optical path becomes more complicated than the third embodiment, the configuration of the fourth embodiment is expected to achieve a higher responsiveness.

In the embodiment, two lens systems having different optical magnifications are used, and it is possible to select a lens having more suitable focal length by including an optical system with a larger number of magnifications. As a result, the image of the flying object displayed on the image display part 14 can be clear. Further, in the embodiment, two Galvano scanners are used for optical path switching. Alternatively, other deflection unit such as a configuration in which one Galvano scanner and two lens systems are respectively provided with one camera; and a configuration in which a deflection mirror is mounted on a solenoid and a piezo-motor so as to switch the optical path systems may be used.

Fifth Embodiment

FIG. 12 is a block diagram of the moving object imaging device 1 and the flying object 2 according to the embodiment. The moving object imaging device 1 is characterized by including an illumination system coaxially disposed with a camera 11. A light source 20, a splitter 21, and a damper 22 are provided, all of which are different from the FIG. 1.

The basic operation related to the imaging and display is the same as that of the first embodiment, and an optical axis 4 of the light source 20 and the optical axis 3 of the camera 11 are set to be the same each ether, such that even when the surroundings of the moving object imaging are so dark that it is difficult to visually recognize the surroundings thereof, light emitted from the light source 20 always arrives at an area imaged by the camera 11 even without using a new deflection unit for the light source, thereby obtaining a clear image. Further, the camera 11 is set as an infrared camera, and a wavelength of the light source 20 is also set as an infrared ray, thereby making it possible to perform monitoring with higher concealment than using a light source of visible light.

Sixth Embodiment

FIG. 13 is a block diagram of the moving object imaging device 1 and the flying object 2 according to the embodiment. The moving object imaging device 1 according to the embodiment is characterized in that the moving object imaging device 1 computes a position and a size of the flying object in the image 102 acquired by the camera 11 and creates the moving image data 104 by cutting out the image 102, thereby always displaying the flying object 2 in a center of the image display 14 at the same size. An image analysis part 23 is provided in FIG. 13, which is different from FIG. 1.

Since the basic operation related to the imaging is the same as that of the first embodiment, operation of the image analysis part 23 and the image processing part 15 will be herein described. The image analysis part 23 has a storage part (not shown), and the storage part stores the image 102 before one period in the imaging period. Then, the stored image and the present image are converted into luminance information of 0-255 (gray scale), and a difference between the respective pixel values of the two images is obtained. A pixel, the difference value of which exceeds a predetermined value, is regarded as a moving part 1 (white), and when a pixel, the difference value of which is lower than a predetermined value, is regarded as 0 (black) (binarization processing). FIG. 14 illustrates a result of the binarization processing with respect to the image 102, and an up-and-down direction is defined as an x-direction and a left-and-right direction is defined as a y-direction. This method is referred to as a frame difference method, a kind of background difference method. When an area of a pixel group having motion in the image has a predetermined size or shape, the pixel group is determined to be the flying object. At this time, a center of gravity A of the pixel group is defined as a center position 107 of the flying object in the image 102, and an average distance between a contour line of the pixel group and the center of the flying object is defined as a size 108. A circle B displayed by alternate long and short dashed lines in FIG. 14 indicates a circle, the radius of which is a calculated size of the flying object. Information on the calculated center position 107 and the size 108 of the flying object is transmitted to the image processing part 15.

Next, the image processing part 15 cuts out a range from the image 102 to be converted into the moving image data 104, and performs enlargement processing. Specifically, the image is generated in such a manner that a point A of FIG. 14 becomes a center and a circle 3 is enlarged to be displayed within the image with a predetermined size. FIG. 15 illustrates the created image data, and the point A is the center and the circle 8 is enlarged to occupy ½ in a vertical direction of the screen. The created images are combined with each other, sent to the image display part 14 as the moving image data 104, and displayed thereon.

According to the procedures described above, the flying object 2 can be displayed at the center with the same size on the image display part 14. Further, in the embodiment, the frame difference method is used for detecting the moving object. Alternatively, proposed are methods with high detection accuracy such as an average background method, a code book method, and the like, or proposed is a method in which a background model is obtained from a previous image by using a mixed normal distribution, thereby reducing an influence caused by environment disturbance, and the aforementioned proposed methods may be used.

Seventh Embodiment

The moving object imaging device 1 according to the embodiment is characterized in that the moving object imaging device 1 computes the position of the flying object in the image 102 acquired by the camera 11, and corrects the deflection angle based upon a magnitude of a deviation amount of a flying object position from the image center. Details of operation of the controller 13 in FIG. 1 will be described. A point of the image analysis is different therefrom. The embodiment is effective for a state in which the update period of the position information obtained from another moving object position measurement unit is significantly longer than the imaging period.

When the position information of the flying object obtained from the moving object position measurement unit is updated at a time point when one previous imaging is finished by the moving object imaging device 1, the controller 13 computes the target deflection angles based upon the obtained position information, drives the two-dimensional Galvano unit 12, and directs the optical axis 3 of the camera 11 toward the flying object 2, thereby performing the imaging. The acquired image 102 is transmitted to the image processing part 15 and the controller 13, and the image processing part 15 executes the color tone correction processing, and the like, after which the moving image data 104 to be transferred to the image display part 14 is created. The controller 13 is configured by including the same function as that of the image analysis part 23 described in the sixth embodiment, and calculates the center position of the moving object in the image according to the same procedures as those of the sixth embodiment, when the imaging is finished and the position information of the flying object obtained by the moving object position measurement unit is not updated at a stage where center position information 107 in the image is obtained, the controller 13 of the embodiment creates the next target deflection angles based upon the center position information 107 within the image. Specifically, when one previous target deflection angles are defined as ($\theta[k-1]$, $\phi[k-1]$) and the center position of the moving object within the image is defined as (x, y), the following target deflection angles ($\theta[k]$, $\phi[k]$) are calculated by the following equation.

$$\theta[k]=\theta[k-1]-k_x x$$

$$\phi[k]=\phi[k-1]-k_y y \quad (3)$$

Here, $k_x$ and $k_y$ are both adjustment parameters. The image including the flying object 2 can be obtained even when the flight speed of the flying object 2 is dramatically changed by correcting the target deflection angles based upon the magnitude of the deviation amount of the flying object center position from the acquired image center.

The present invention is not limited to the embodiments described above, however, includes various modifications. For example, the embodiments described above are described in detail in order to describe the present invention in an easy-to-understand manner, and are not necessarily limited to those having all of the described configurations. For example, the moving object is defined as the flying object in the embodiment, however, a traveling object or a floating object is alternatively assumed in the other embodiment.

REFERENCE SIGNS LIST

1: moving object imaging device
2: flying object
11: camera
12: two-dimensional Galvano unit
13: controller
14: image display part
15: image processing part
101a, 101b: driving current
102: image
104: moving image data

The invention claimed is:

1. A moving object imaging device comprising:
   an imaging unit and a deflector that changes a relative deflection angle of a moving object and the imaging unit, and performs a first imaging of the moving object using the imaging unit through the deflector,
   the moving object imaging device being configured in which the deflector is moved to a first predetermined deflection angle so that the moving object enters a visual field of the imaging unit based upon position information of the moving object obtained from the outside and the moving object is imaged in a state of keeping the deflection angle during the first imaging of the moving object,
   wherein the imaging unit is configured to be able to image a plurality of moving objects; and
   an image display part configured to simultaneously display the plurality of moving objects,
   wherein after the imaging unit finishes the first imaging, the imaging unit starts to change the deflection angle and performs next imaging with a second predetermined deflection angle, and
   wherein the deflector is a Galvano scanner.

2. The moving object imaging device according to claim 1, comprising:
   an image processing part configured to process the image, which is imaged by the imaging unit, into a plurality of moving images.

3. The moving object imaging device according to claim 1, further comprising:
   an optical magnification adjustment mechanism of the imaging unit.

4. The moving object imaging device according to claim 1, wherein
   a plurality of optical paths are provided between the deflector and the imaging unit.

5. The moving object imaging device according to claim 1, wherein
   an illumination system is coaxially disposed with the imaging unit.

6. The moving object imaging device according to claim 1, further comprising:
   an image analysis part configured to specify a moving object position and a moving object size within an acquired image, wherein the image analysis part determines a display range of the acquired image based upon information of the moving object position and the moving object size within the computed image.

7. The moving object imaging device according to claim 1, further comprising:
an image analysis part configured to specify a moving object position within an acquired image, wherein
a deflection angle of the deflector is corrected based upon the moving object position within the image.

8. The moving object imaging device according to claim 1, wherein the image display part is configured to display each of the moving objects in a separate portion of the image display part.

9. A moving object imaging method, comprising
obtaining position information of a moving object;
moving a deflector to a predetermined deflection angle so that the moving object enters a visual field of an imaging unit based upon the position information, thereby performing imaging of the moving object using the imaging unit through the deflector in a state of keeping the deflection angle during the imaging of the moving object;
wherein the imaging unit is configured to be able to image a plurality of moving objects; and
simultaneously displaying the plurality of moving objects on an image display part,
wherein after the imaging unit finishes the first imaging, the imaging unit starts to change the deflection angle and performs next imaging with a second predetermined deflection angle, and
wherein the deflector is a Galvano scanner.

10. The moving object imaging method according to claim 9, wherein the image display part is configured to display each of the moving objects in a separate portion of the image display part.

* * * * *